(12) United States Patent
Chiu et al.

(10) Patent No.: US 6,975,348 B2
(45) Date of Patent: Dec. 13, 2005

(54) FOCUSING METHOD FOR A MOVING OBJECT

(75) Inventors: Chaucer Chiu, Taipei (TW); Xu Dong Wang, Shanghai (CN)

(73) Assignee: Inventec Corporation, (TW)

( * ) Notice: Subject to any disclaimer, the term of this patent is extended or adjusted under 35 U.S.C. 154(b) by 700 days.

(21) Appl. No.: 10/075,264

(22) Filed: Feb. 15, 2002

(65) Prior Publication Data

US 2003/0156215 A1    Aug. 21, 2003

(51) Int. Cl.⁷ ............................................. H04N 5/225

(52) U.S. Cl. ...................... 348/169; 348/349; 382/103; 382/170

(58) Field of Search ................................ 348/345, 348, 348/352, 140, 142, 169, 349; 382/103, 106, 382/168, 170, 255

(56) References Cited

U.S. PATENT DOCUMENTS 6,507,366 B1 * 1/2003 Lee ............................ 348/352
2003/0118245 A1 * 6/2003 Yaroslavsky et al. ....... 382/255

* cited by examiner

*Primary Examiner*—David L. Omet
*Assistant Examiner*—Brian Jelinek
(74) *Attorney, Agent, or Firm*—Jacobson Holman PLLC

(57) ABSTRACT

A focusing method for a moving object that involves using a gray histogram and a histogram projection drawing to analyze the serial images taken by a photographic instrument, taking a pattern from the images of the serial images, comparing every image of the serial images by means of pattern matching, and eventually generating a new pattern. Given the patterns and the updated patterns that are in sequential order, discrepancies between a pattern and an updated pattern can be found by comparison so as to acquire the information about the dynamic movement of the moving object.

10 Claims, 4 Drawing Sheets

FOCUSING METHOD FOR A MOVING OBJECT

FIELD OF THE INVENTION

The invention is a method for tracing moving objects, and more particularly, a focusing method for moving objects that employs pattern matching to trace moving objects.

BACKGROUND OF THE INVENTION

Given the development of multimedia communication and the increasingly powerful functions of computers, image processing of dynamic objects has gradually become a popular topic for research. The images of dynamic objects are usually displayed as full-motion videos by displaying serial images. Accordingly, serial image processing has become an important technique for images processing.

Since serial images involve a series of images, identifying the target objects shown in the images is a main task in images processing. In practice, the targets of serial images are divided, identified and traced. The technique applies to many fields, such as automatic monitoring, sports broadcasting, video frequency compression, monitoring production lines and intelligent traffic control.

In addition, target tracing in images processing has become a key technique in the latest technology of MPEG-4, wherein MPEG-4z provides content-based image operation by means of the technique of target tracing and division. Therefore, a thorough exploration of this technology will have far-reaching effects upon the development of its various applications.

For the time being, there are many computation methods for target identification and tracing, wherein the most widely used is the computation method of pattern matching and updating that is based on the features of images. This computation method compares the image features currently extracted with the features of the pattern of the target being traced. The features adopted are usually the marginal features of the images. The last step of the computation method is matching the target pattern and the current images, and updating the pattern simultaneously. A recently developed means of pattern matching based on Hausdorff distance is quite effective. However, the disadvantage of this is that, in the course of matching, the space of searching increases rapidly with the size of the image and the size of the pattern, creating a larger and larger workload for the memory and the processor required to conduct the searching. Furthermore, extracting image features is not an easy job, as the efficiency of searching and tracing is reduced with the size of image and the size of pattern, making goals achievement extremely difficult.

Therefore, the most important issues of research are precision, automation and efficiency in target tracing.

OBJECT AND SUMMARY OF THE INVENTION

In view of the aforesaid problems of the known technology, the object of the invention is to provide a focusing method for a moving object that employs pattern matching to trace and take pictures of a moving object automatically.

Another object of the invention is to provide a focusing method for a moving object that identifies a target object and updates a pattern by means of the information of the gray histograms and histogram projection drawings of the serial images.

In order to achieve the aforesaid objects, the invention discloses a focusing method for a moving object that employs a photographic instrument to take images of a moving object and focuses the photographic instrument by means of pattern matching. It involves the following steps: set an optimal pattern matching position; retrieve a serial image of the moving object; acquire an initial pattern of the moving object and an initial pattern position according to the serial image; and compare the initial pattern position with the optimal pattern matching position so as to adjust the photographic angle of the photographic instrument.

The invention also discloses a focusing method for a moving object that involves the following steps: retrieve a serial image of the moving object; acquire an initial pattern of the moving object and an initial pattern position according to the serial image; carry out pattern matching to find an optimal matching position of the moving object according to the serial image; acquire an updated pattern and an updated pattern position according to the optimal matching position; and adjust a photographic angle of the photographic instrument according to the updated pattern position.

The pattern is acquired by means of the following steps: retrieve a serial image of the moving object; calculate a gray histogram for the image; calculate a grayness projection drawing for the image; and acquire the initial pattern and the initial pattern position according to the gray histogram and the histogram projection drawing.

As regards the characteristics and practical operation of the invention, detailed explanations and drawings of the preferred embodiment are given below:

DETAILED EXPLANATION OF THE INVENTION

Figure 1:
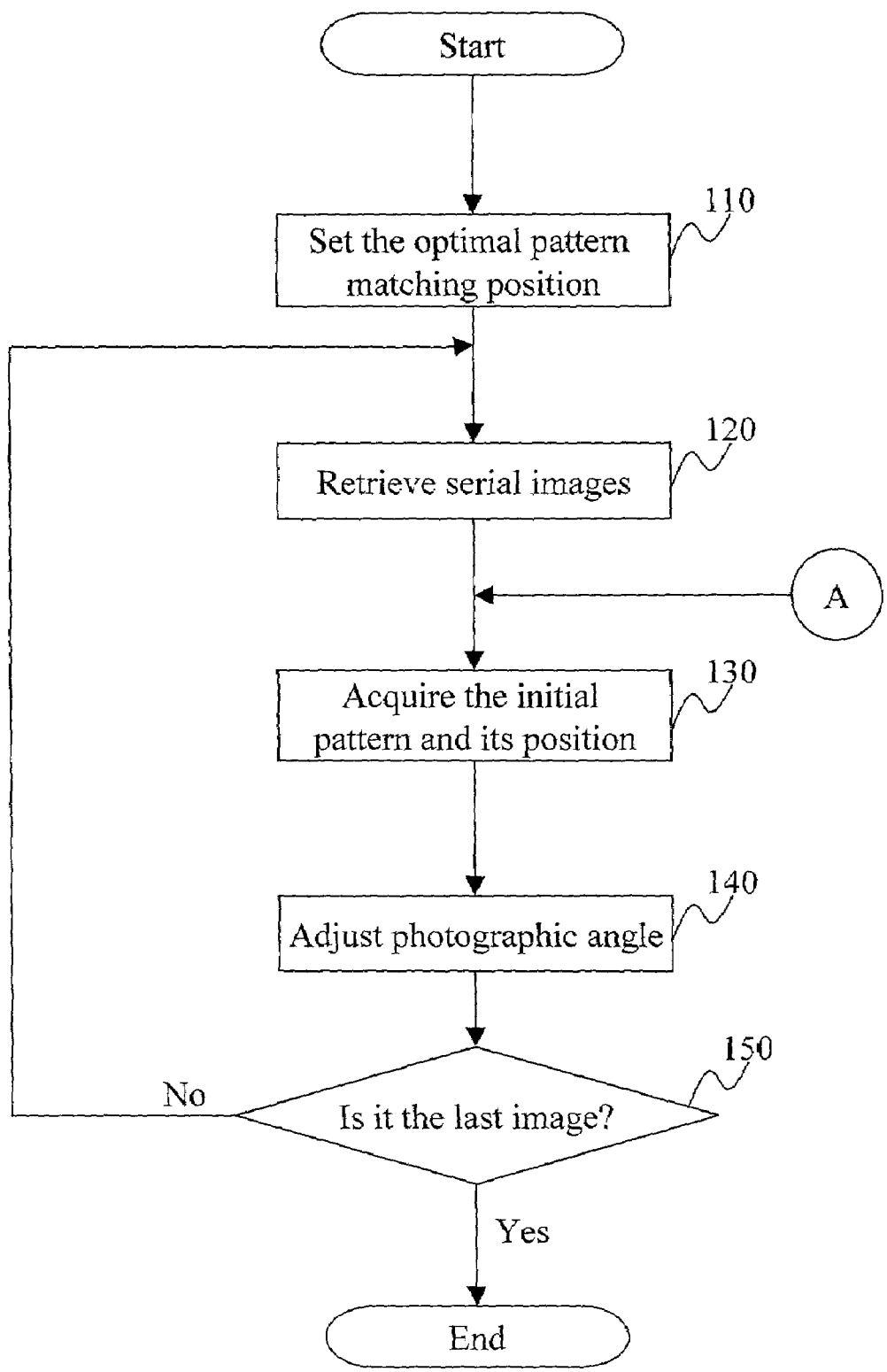
FIG. 1 shows a flowchart of the first preferred embodiment of the focusing method for a moving object as disclosed by the invention.

As regards camera-based image retrieval, a camera generates images by means of serial images and the camera is focused by adjusting the photographic angle. The invention enables the photographic angle of a camera to be directly adjusted through processing serial images.

The invention adopts a target identifying and tracing method that is based on a gray histogram. After a gray histogram projection drawing of an image has been acquired, the horizontal projection drawing and the vertical projection drawing are figured out. Movement prediction and the similarity between the amplitudes (of the images) are taken into account so as to determine the position of the target. The invention also incorporates the concept of pattern updating, and automatically adjusts the pattern of the target being traced, with a view to achieving automatic tracing of the target.

In order to make the tracing results more accurate, the invention adopts pre-processing of local enhancement, so as to enhance the contrast between a target and the background. The Invention also adopts two criteria for measuring the degree of pattern matching in order to increase the precision of target identifying and tracing. In other words, the invention adopts the method of double-pattern updating and matching, so that the method of the invention has a stronger real-time reaction to any sudden changes. Since it is easy to acquire a gray histogram, the invention requires fewer calculations; and experience has proven that the method of the invention enables practical processing.

As disclosed by the invention, the movement of traced targets is divided into two parts, firstly, the change in the position of an object, secondly, the change in the geometrical shape of an object. Both parts are defined in a two-dimensional manner. Non-rigid deformation of an object may be treated as a kind of change in geometrical shape, when it is caused by a change of viewing angle, lens and projection drawing. In this regard, various movements of a traced object are taken into account, and it is assumed that the change in the geometrical shape of an object is continuous and slow. This assumption is usually correct in normal conditions. The detailed operational procedure of the target identification and automatic tracing disclosed by the invention is as follows:

The target identification and automatic tracing disclosed by the invention are divided into two parts: pattern matching and pattern updating. After an initial pattern has been acquired, the optimal matching position of a traced target is searched for in every subsequent image. Once the optimal matching position is found, the matching pattern is updated according to the content of the image. Then, pattern matching for the next image is carried out. In this way, the task of pattern matching and the task of pattern updating are carried out in an alternate manner, until target identifying and tracing of all the serial images is completed. As regards pattern matching, it makes good use of image colors to acquire the potential matching points of a traced object, and it finds the optimal matching position by methods such as movement prediction. For the detailed operational process, refer to the drawings and the explanation given below.

Please refer to FIG. 1, which shows the first detailed implementation flowchart for the focusing method of a moving object. The flowchart has the following steps: set the optimal pattern matching position (step 110); retrieve serial images (step 120); acquire the initial pattern and its position (step 130); adjust photographic angle (step 140); and determine whether it is the last image (step 150).

Once any object emerges before a camera, there will be a change of the serial images taken by the camera. The method of the invention identifies the moving object by comparison, and traces the moving object automatically. First of all, set the optimal pattern matching position (step 110). The position can either be the focus of the camera, or be in a place surrounding the focus of the camera. Then, retrieve serial images (step 120). Figure out the position and the size of the target object according to the serial images, and display the target object of the images in the form of a pattern, or, in other words, acquire the initial pattern and its position (step 130). Once the pattern and the position of the target object have been acquired, the distance between the target object and the focus is determined, and an adjustment is made in the photographic angle (step 140). Finally, if the image is the last one of the serial images (step 150), the target object is actually beyond the view of the camera and thus the serial images taken by the camera no longer includes any image of the target object. Stop tracing the target.

Figure 2:
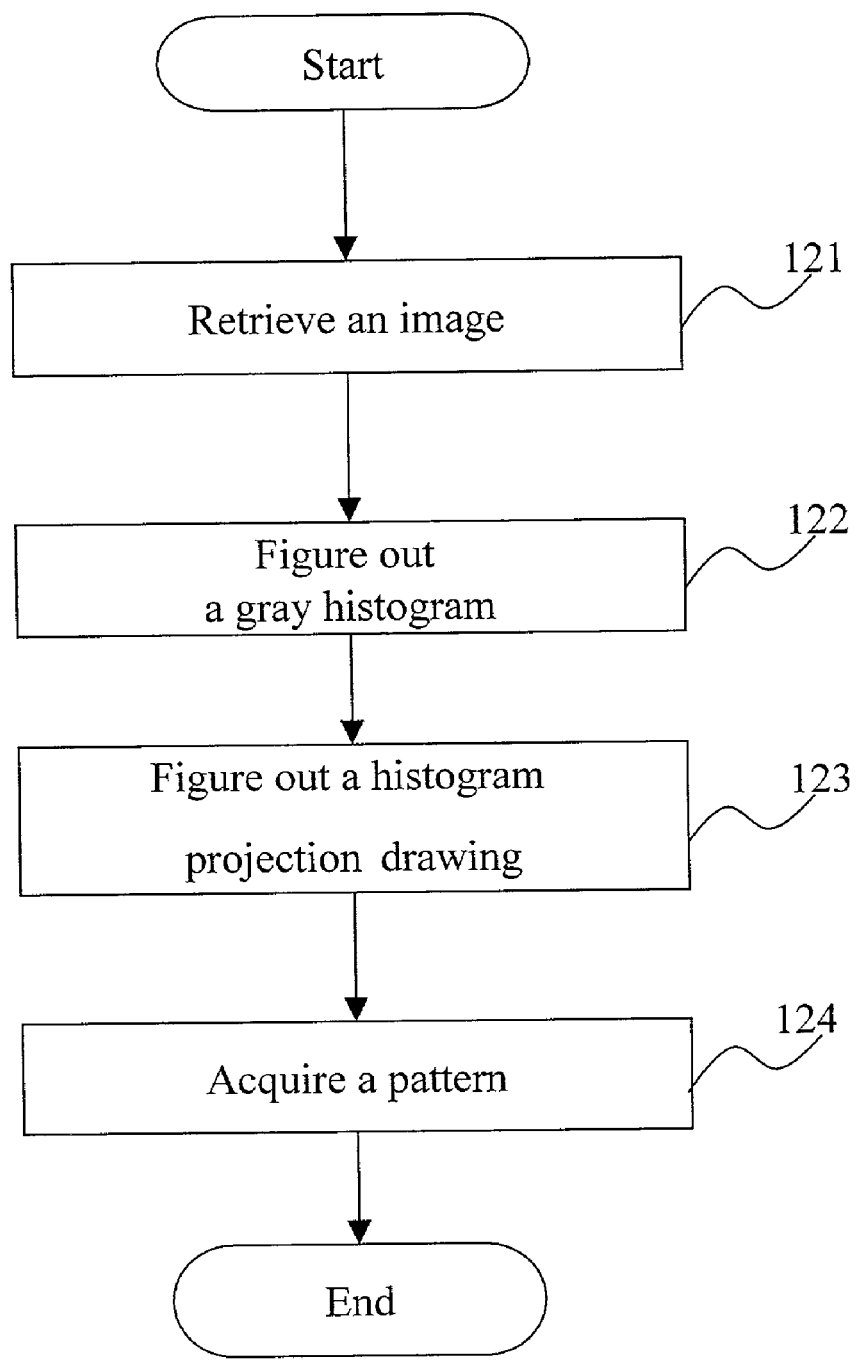
FIG. 2 shows a flowchart of the acquisition of a pattern of the focusing method for a moving object as disclosed by the invention.

How to acquire the initial pattern between step 110 and step 120 in FIG. 1? As mentioned above, the invention involves the use of a gray histogram and histogram projection drawing to determine the position of a pattern. For the method of acquiring the pattern, refer to FIG. 2, which shows a flowchart of the acquisition of patterns of the focusing method for a moving object as disclosed by the invention. The flowchart comprises the following steps: retrieve an image (step 121); figure out the gray histogram (step 122); figure out a histogram projection drawing (step 123); and acquire a pattern (step 124).

As long as an image is retrieved from the serial images (step 121), the gray histogram may be figured out according to all the information contained in the image (step 122). The two peak values of the gray histogram represent the positions of the object and the background, respectively. Then, once the histogram projection drawing is figured out (step 123), the position of the object is determined. Finally, a pattern is acquired (step 124).

In fact, it is possible to explain the focusing method of the invention in another way. Please refer to FIG. 3 for the flowchart of the second preferred embodiment of the focusing method for a moving object as disclosed by the invention. The flowchart comprises the following steps: retrieve serial images (step 310); acquire the initial pattern (step 320); find the optimal matching position (step 330); acquire an updated matching pattern (step 340); adjust photographic angle (step 350); and determine whether it is the last image of the serial images (step 360).

Figure 3:
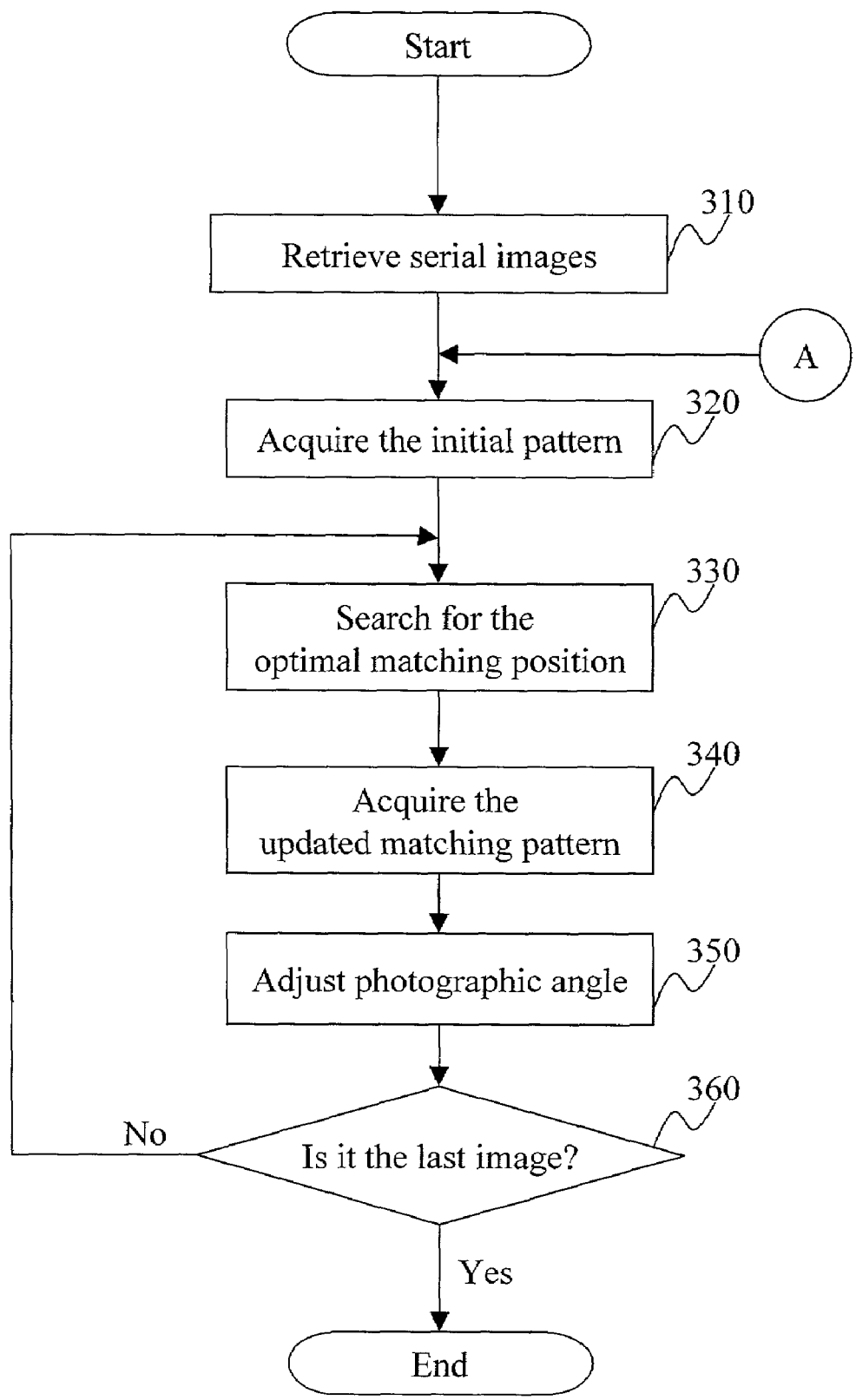
FIG. 3 shows a flowchart of the second preferred embodiment of the focusing method for a moving object as disclosed by the invention.

The process shown in FIG. 3 further discloses how the invention constructs a focusing method by means of pattern matching. First of all, it also retrieves serial images with a camera (step 310). The retrieved serial images form the basis for the acquisition of patterns. Then, the initial pattern of the target object is acquired (step 320). The patterns are acquired in a manner similar to that depicted in FIG. 2. After the initial pattern has been acquired, use it as a basis for comparison for pattern matching, and search for the optimal matching position (step 330) from the subsequent images, or, in other words, carry out pattern matching by means of the initial pattern. In the course of pattern matching, the position of the target object of the next image of the serial images can be determined, through comparison, by means of the initial pattern (step 330). Once the optimal matching position of the next image is found, an updated matching pattern is acquired (step 340). The photographic angle is adjusted according to the position of the initial pattern and the position of the updated matching pattern (step 350). Then, decide whether the image is the last one of the serial images (step 360). If no, the updated matching pattern is treated as the initial pattern. Go back to step 330, search for the optimal matching position of the next image, continue to carry out pattern matching and photographic angle adjustment unless and until the target object disappears and no more serial images are generated.

Figure 4:
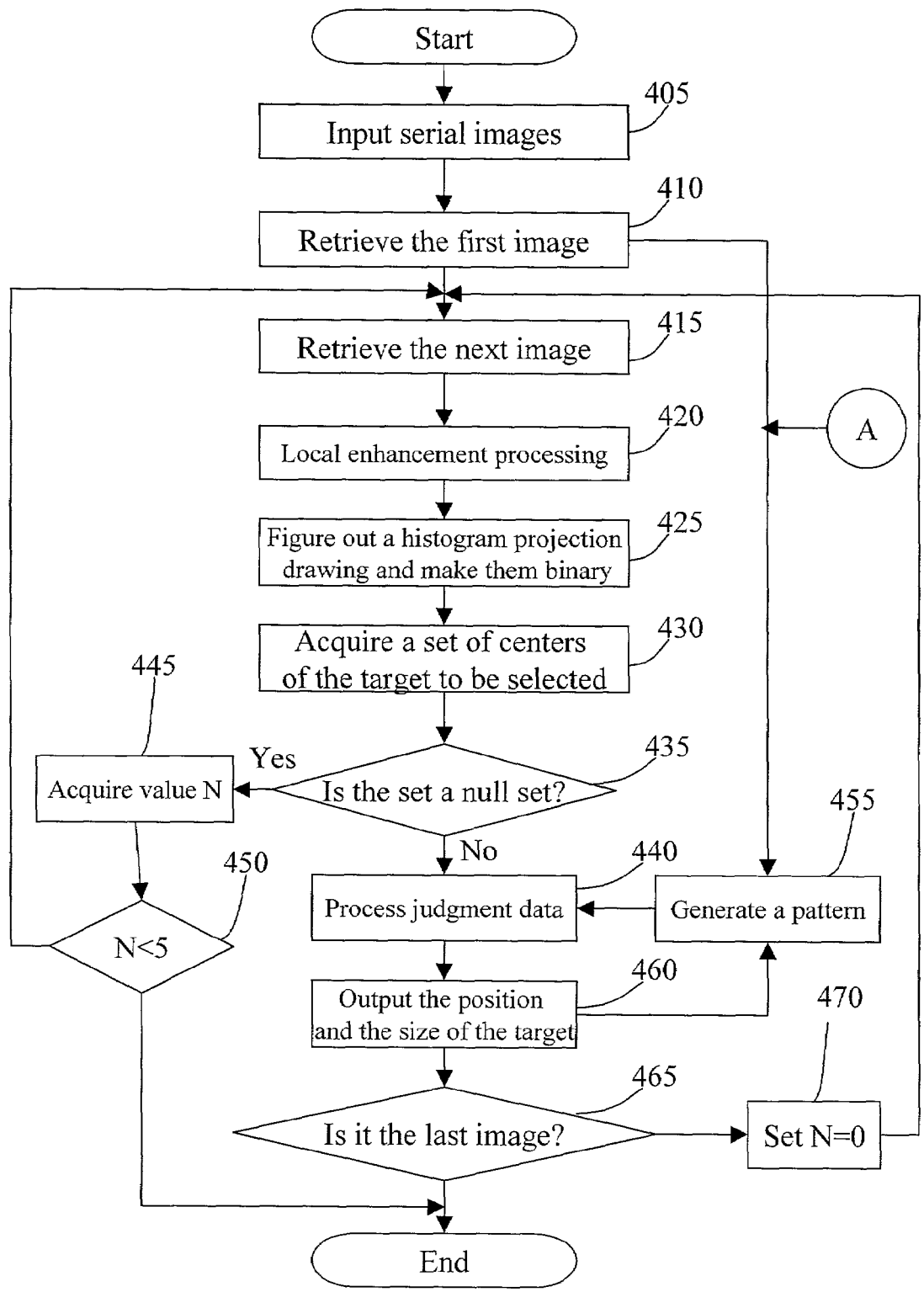
FIG. 4 shows a detailed flowchart of the preferred embodiment of the focusing method for a moving object as disclosed by the invention.

In FIG. 4 there is a more detailed explanation of the focusing method for a moving object as disclosed by the invention. The following steps are involved: input serial images (step 405); retrieve the first image (step 410); retrieve the next image (step 415); perform local enhancement processing (step 420); figure out a histogram projection drawing and make it binary (step 425); acquire a set of the centers of the target to be selected (step 430); determine whether the set is a null set (step 435); process the judgment data (step 440); get the n value (step 445); determine whether n is less than 5 (step 450); generate a pattern (step 455); output the position and the size of target (step 460); determine whether it is the last image (step 465); set n=0 (step 470).

Similarly, input the serial images (step 405), retrieve the first image (step 410), and generate a pattern (step 455). The pattern is generated for the purpose of pattern matching. The way the patterns are generated is similar to that described in FIG. 2. Then, retrieve the next image from the serial images (step 415) and process the presently retrieved image with local enhancement (step 420). The local enhancement process is designed to increase the contrast between an object and the background. Whenever two peak values appear in the gray histogram, it can be assumed that they represent the object and the background of the image, respectively. Corresponding grayness grades may be extended, compressed or processed by other means—histogram equilibrium—so that, in the image, the contrast between the object and the background is enhanced. The first step of such processing is to acquire the gray histogram from the original gray histogram, and determine the corresponding coping method.

After the retrieved second image has been processed by local enhancement, the data contained in the second image is processed. That is, figure out the a histogram projection drawing and make them binary (step 425); acquire a set of the centers of the targets to be selected from the histogram projection drawing (step 430); decide whether the set of centers of targets is a null set or not (step 435); if no, then the target object is present; process the judgment data (step 440); if the set is a null set, then get the n value (step 445), or, in other words, acquire the grayness value of the center of the target. After step 445, examine the n value, and decide whether n is less than 5 or not (step 450); if yes, then it means the target has disappeared; if no, go to step 415 and continue to retrieve the next image for judgment.

In step 440, when the judgment data is processed, the pattern generated in step 455 is compared and matched, then the position and the size of the target are outputted (step 460). Then, treat the position and the size of the presently generated target as a new pattern, or, in other words, go back to step 455. Decide whether the image is the last one or not (step 465). If yes, then end. If no, then set n=0 (step 470), return to step 415 and continue to make judgments about the next image.

In the course of generation of a pattern or an updated pattern, the corresponding information about the position of the pattern is generated. Given the continually updated position information, not only can the target object be tracked down, but also the photographic angle can be adjusted.

While the invention has been described by way of example and in terms of a preferred embodiment, it is to be understood that the invention is not limited thereto. It should be understood that the detailed description and specific examples, while indicating preferred embodiments of the invention, are given by way of illustration only, since various changes and modifications within the spirit and scope of the invention will become apparent to those skilled in the art from this detailed description. Therefore the scope of protection for the invention should conform to the claims attached below.

What is claimed is:

1. A focusing method for a moving object which utilizes a photographic instrument to take images of a moving object, and focuses said photographic instrument by means of a pattern matching method, comprises the following steps:
setting an optimal matching pattern position;
retrieving a serial image of said moving object;
acquiring an initial pattern of said moving object and an initial pattern position according to said serial image; and
comparing said initial pattern position and said optimal matching pattern position so as to make an adjustment in the photographic angle of said photographic instrument;
wherein the step of acquiring said initial pattern comprises the following sub-steps:
retrieving an image of said serial image;
figuring out a gray histogram of said image;
figuring out a histogram projection drawing of said image; and
acquiring said initial pattern and said initial pattern position according to said gray histogram and said histogram projection drawing.

2. The focusing method for a moving object of claim 1, wherein said optimal matching pattern position is the focus of said photographic instrument.

3. The focusing method for a moving object of claim 1, wherein said optimal matching pattern position is around the focus of said photographic instrument.

4. The focusing method for a moving object of claim 1, wherein the adjustment of said photographic angle is the conversion of the difference between said initial pattern position and said optimal matching pattern position into the adjusted photographic angle of said photographic instrument.

5. A focusing method for a moving object which utilizes a photographic instrument to take images of a moving object, and focuses said photographic instrument by means of a pattern matching method, comprises the following steps:
retrieving a serial image of said moving object; acquiring an initial pattern of said moving object and an initial pattern position according to said serial image;
carrying out pattern matching and search for an optimal matching position of said moving object according to said serial image;
acquiring an updated pattern and an updated pattern position of said moving object according to said optimal matching position; and
making an adjustment in a photographic angle of said photographic instrument according to said updated pattern position;
wherein the step of acquiring said initial pattern comprises the following sub-steps:
retrieving an image of said serial image;
figuring out a gray histogram of said image;
figuring out a histogram projection drawing of said image; and
acquiring said initial pattern and said initial pattern position according to said gray histogram and said histogram projection drawing.

6. The focusing method for a moving object of claim 5, wherein said pattern matching is carried out according to the comparison between said initial pattern and the image of said serial image.

7. The focusing method for a moving object of claim 5, wherein the determination of said optimal matching position is based on the comparison between said initial pattern and the image of said serial image, so as to decide that the image of said serial image would represent the pattern position of said moving object.

8. The focusing method for a moving object of claim 5, wherein the step of acquiring said updated pattern comprises the following sub-steps of:
- retrieving an updated image of said serial image according to said optimal matching position;
- figuring out a gray histogram of said updated image;
- figuring out a histogram projection drawing of said updated image; and
- acquiring said updated pattern and said updated pattern position according to said gray histogram and said histogram projection drawing.

9. The focusing method for a moving object of claim 5 or 8, wherein before the sub-step of figuring out a gray histogram for said updated image, further comprises a sub-step of carrying out local enhancement according to said initial pattern.

10. The focusing method for a moving object of claim 5, wherein the adjustment of said photographic angle is the conversion of the difference between said initial pattern position and said updated pattern position into said adjusted photographic angle.

* * * * *